United States Patent Office 2,797,223
Patented June 25, 1957

2,797,223

PREPARATION OF 14-BROMOCODEINONE

Harold Conroy, Plainfield, N. J., assignor to Merck & Co., Inc., Rahway, N. J., a corporation of New Jersey No Drawing. Application August 16, 1954,
Serial No. 450,233

19 Claims. (Cl. 260—285)

This invention relates to the preparation of 14-bromocodeinone and particularly to the preparation of 14-bromocodeinone from thebaine.

The compound 14-bromocodeinone has been found to be particularly useful in the synthesis of codeinone. Heretofore, 14-bromocodeinone has been prepared by the bromination of thebaine in an acetic acid solution. This process, while having certain advantages, results in a yield of only about 50%. The mechanism of this bromination of thebaine with molecular bromine quite likely involves the formation of the perbromide which precipitates from the acetic acid solution in the form of an orange gum, but which later redissolves to give a nearly colorless solution which, upon the addition of water, hydrolyzes to 14-bromocodeinone hydrobromide.

An object of the invention is to produce 14-bromocodeinone in relatively high yield by a simple process. Other objects and the advantages of the invention will appear hereinafter.

In accordance with the invention, thebaine (Compound I) is reacted with a N-bromo-amide or N-bromo-imide to form 14-bromocodeinone (Compound II). This reaction may be chemically represented as follows:

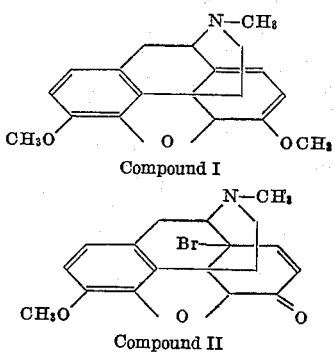

The thebaine is reacted with a N-bromo-amide or N-bromo-imide to form 14-bromocodeinone. The imide and amide having the following general formulas:

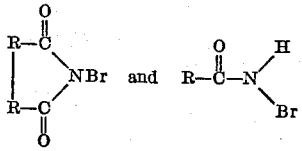

wherein R is an aromatic or aliphatic radical preferably containing from one to eight carbon atoms. Typical examples of such compounds are bromoacetamide, bromopropinamide, bromoglutarimide, bromophthalimide and bromosuccinimide.

It has been found that optimum yields are obtained when the reaction is carried out in the presence of an aqueous organic solvent such as a ketone and preferably one containing from one to eight carbon atoms, a lower aliphatic ketone in aqueous solution being one of the most desirable solvents. Typical examples of suitable ketones are acetone, methyl ethyl ketone, diethyl ketone, methyl-n-propyl ketone, methyl-heptyl ketone, methyl isobutyl ketone and cyclohexanone. The reaction is preferably carried out at a temperature of below 30° C., a temperature of 10° to 20° C. being most desirable. The reaction is usually complete in from one to four hours. The 14-bromocodeinone, which crystallizes from the reaction mixture, can be recovered by filtering the solution and washing with water.

The following examples are given for purposes of illustration.

Example 1

Thebaine (62.2 g., 0.2 mole) is suspended in 200 cc. of 2:1 (by vol.) acetone-water mixture. A solution of 37.0 g. (0.208 mole) of N-bromosuccinimide in 400 cc. of 2:1 acetone-water is run in with mechanical stirring over a period of 15 minutes. The temperature is maintained at 15–18° C. by external cooling. The clear solution is aged 10 minutes at 15–18° C. One liter of water is added over 30 minutes with stirring, during which time the bromocodeinone crystallized. Stirring is continued for one hour at 20° C., and then for another two hours at 0–5° C. The product is sucked dry and washed with 500 cc. of water. Yield, after drying to constant weight at 60° C. is 64 g. (85%) of 14-bromocodeinone. The melting point is above 154° C. but below 157° C.; the literature value is 156° C.

Example 2

The N-bromosuccinimide in Example 1 is replaced with an equivalent amount of N-bromoacetamide with equally high yield of 14-bromocodeinone.

Example 3

The N-bromosuccinimide in Example 1 is replaced with an equivalent amount of N-bromophthalimide, and the acetone is replaced with methyl ethyl ketone with equally high yield of 14-bromocodeinone.

Any departure from the above description which conforms to the present invention is intended to be included within the scope of the claims.

What is claimed is:

1. A process which comprises reacting thebaine with a N-bromo-amide to produce 14-bromocodeinone.

2. The process of claim 1 wherein the reaction is carried out in the presence of a ketone.

3. The process of claim 1 wherein the reaction is carried out in the presence of an aqueous solution of a ketone.

4. The process of claim 1 wherein the reaction is carried out in the presence of an aqueous solution of a lower aliphatic ketone.

5. The process of claim 4 wherein the reaction is carried out at a temperature of less than 30° C.

6. The process of claim 5 wherein the temperature is from 10 to 20° C.

7. A process which comprises reacting thebaine with N-bromoacetamide in the presence of an aqueous solution of a ketone to produce 14-bromocodeinone.

8. A process which comprises reacting thebaine with a N-bromo-imide to produce 14-bromocodeinone.

9. The process of claim 8 wherein the reaction is carried out in the presence of a ketone.

10. The process of claim 8 wherein the reaction is carried out in the presence of an aqueous solution of a ketone.

11. The process of claim 8 wherein the reaction is carried out in the presence of an aqueous solution of a lower aliphatic ketone.

12. The process of claim 11 wherein the reaction is carried out at a temperature of less than 30° C.

13. The process of claim 12 wherein the temperature is from 10 to 20° C.

14. A process which comprises reacting thebaine with N-bromosuccinimide in the presence of an aqueous solution of a ketone to produce 14-bromocodeinone.

15. A process which comprises reacting thebaine with N-bromophthalimide in the presence of an aqueous solution of a ketone to produce 14-bromocodeinone.

16. A process which comprises reacting thebaine with N-bromosuccinimide in the presence of an aqueous solution of acetone at a temperature of less than 30° C. to produce 14-bromocodeinone.

17. A process which comprises reacting thebaine with N-bromoacetamide in the presence of an aqueous solution of acetone at a temperature of less than 30° C. to produce 14-bromocodeinone.

18. A process which comprises reacting thebaine with N-bromophthalimide in the presence of an aqueous solution of methyl ethyl ketone at a temperature of less than 30° C. to produce 14-bromocodeinone.

19. A process which comprises reacting thebaine with a compound selected from the group consisting of an N-bromo-amide and an N-bromo-imide to produce 14-bromocodeinone.

References Cited in the file of this patent
UNITED STATES PATENTS 2,472,361  Arsem _____ June 7, 1949

OTHER REFERENCES

Freund: Berichte, vol. 39, pp. 844–50 (1906).

Schmid et al.: Helv. Chim. Acta, vol. 29, pp. 573–581 (1946).